(12) United States Patent
Lee

(10) Patent No.: US 8,656,148 B2
(45) Date of Patent: Feb. 18, 2014

(54) DEVICE INFORMATION COLLECTING METHOD AND SYSTEM IN COMPUTER SYSTEM

(75) Inventor: Yu-Chen Lee, Taipei (TW)

(73) Assignee: ASUSTeK COMPUTER INC., Taipei (TW)

( * ) Notice: Subject to any disclaimer, the term of this patent is extended or adjusted under 35 U.S.C. 154(b) by 670 days.

(21) Appl. No.: 12/791,203

(22) Filed: Jun. 1, 2010

(65) Prior Publication Data

US 2010/0313005 A1 Dec. 9, 2010

(30) Foreign Application Priority Data

Jun. 5, 2009 (TW) .............................. 98118838 A

(51) Int. Cl.
*G06F 9/24* (2006.01)
(52) U.S. Cl.
USPC .................. 713/2; 713/1; 713/100; 709/221; 718/1; 718/100

(58) Field of Classification Search
USPC ................ 713/1, 2, 100; 709/221; 718/1, 100
See application file for complete search history.

(56) References Cited

U.S. PATENT DOCUMENTS 7,343,523 B2 * 3/2008 Cheong et al. ............. 714/38.12
7,487,406 B2 * 2/2009 Kobrosly et al. ................ 714/49
7,640,394 B2 * 12/2009 Kanno et al. ................... 711/112

* cited by examiner

*Primary Examiner* — M Elamin
(74) *Attorney, Agent, or Firm* — Jianq Chyun IP Office

(57) ABSTRACT

The invention discloses a device information collecting method in a computer system including the following steps: booting a computer system and entering an operating system; executing a collecting application program in the operating system for detecting a plurality of device information and settings in the computer system and storing the device information and settings as a log file and building up a virtual reference computer system according to the log file.

12 Claims, 3 Drawing Sheets

DEVICE INFORMATION COLLECTING METHOD AND SYSTEM IN COMPUTER SYSTEM

FIELD OF THE INVENTION

The invention relates to a device information collecting method and, more particularly, to a device information collecting method in a computer system and the computer system using thereof.

BACKGROUND OF THE INVENTION

As everyone knows, computer manufacturers usually have a maintenance center or a customer service center. When a user has problems in operating a computer system, he or she may contact the maintenance center or the customer service center to solve problems generated in the computer system.

When the user cannot bring the computer system to the maintenance center, he or she may state the problem generated in the computer system to the contact staff in telephone. Generally, the contact staff first inquires the device information of the user's computer system and then builds up a virtual reference computer system whose device information and settings are the same as those of the user's computer system. Afterwards, the contact staff finds out and solves the problems in the computer system according to the built-up virtual reference computer system and the statement of the user. The device information and settings of the computer system includes the information of a central processing unit (CPU) model, a hard disk model, an interface card model, a memory model and capacitance, basic input/output system (BIOS) settings, a motherboard model and so on.

To get the device information and settings of the computer system, the user needs to enter the BIOS to view the settings as well as the device information in the device manager of the operating system. Afterwards, users shall inform the contact staff about the device information and settings through telephone. However, it is time-consuming for a user that is not familiar with computer systems to check the information, and the user may make mistakes to state the device information and settings to the contact staff on phone. As a result, the contact staff is hard to get related information to solve the problem. Moreover, the contact staff has to communicate with the user for many times to ensure the device information and settings of the computer system, which makes the user impatient, and the contact staff may need longer time to solve the problem.

SUMMARY OF THE INVENTION

The invention discloses a device information collecting method in a computer system. The present invention utilizes a collecting application program to store device information and settings of the computer system as a log file, thereby allowing a contact staff to build up a virtual reference computer system according to the log file.

The invention discloses a device information collecting method in a computer system. The method includes the steps as follows: booting a computer system and entering an operating system; executing a collecting application program in the operating system to detect a plurality of device information and settings in the computer system and storing the device information and settings as a log file; and building up a virtual reference computer system according to the log file.

The invention further discloses a device information collecting method in a computer system including the steps as follows: switching a first connecting port in a first computer system to an embedded controller in the first computer system; connecting the first connecting port to a second connecting port in a second computer system; executing a collecting application program in the second computer system for detecting a plurality of device information and settings in the first computer system and storing the device information and settings as a log file; and building up a virtual reference computer system according to the log file.

In addition, the invention further discloses a computer system including a CPU, a BIOS, an embedded controller, a connecting port, a path switching unit connected to the connecting port and the embedded controller and a control chip connected to the CPU, the BIOS, the embedded controller and the path switching unit. When the computer system is not booted, the path switching unit controls the connecting port to connect the embedded controller, thereby allowing another computer system to retrieve data in a memory unit of the embedded controller.

BRIEF DESCRIPTION OF THE DRAWINGS

These and other features, aspects and advantages of the present invention will become better understood with regard to the following description, appended claims, and accompanying drawings.

DETAILED DESCRIPTION OF PREFERRED EMBODIMENTS

According to the first embodiment of the invention, a collecting application program is used to store device information and settings of a computer system as a log file. Then, the user may send the log file to a contact staff by email for the contact staff to build up a virtual reference computer system according to the log file and find out problems quickly. The device information and settings in the log file include the information of a CPU model, a hard disk model, an interface card model, a memory model and capacity, BIOS settings, a motherboard model and so on.

Figure 1:
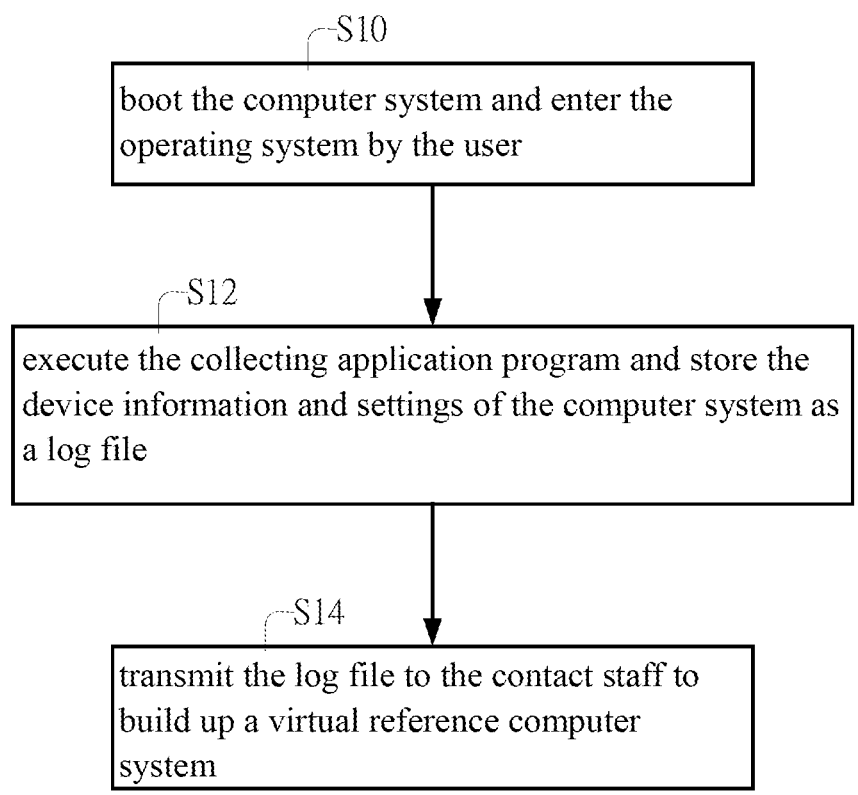
FIG. 1 is a flow chart showing the device information collecting method in the computer system in the first embodiment of the invention.

FIG. 1 is a flow chart showing the device information collecting method in the computer system in the first embodiment of the invention. As shown in the first embodiment of the invention, the computer system is able to be booted and an operating system also can be executed. In step S10, the user boots the computer system and enters the operating system. In step S12, the collecting application program is executed to store device information and settings of the computer system as a log file. In step S14, the log file is transmitted to the contact staff to build up a virtual reference computer system.

Figure 2:
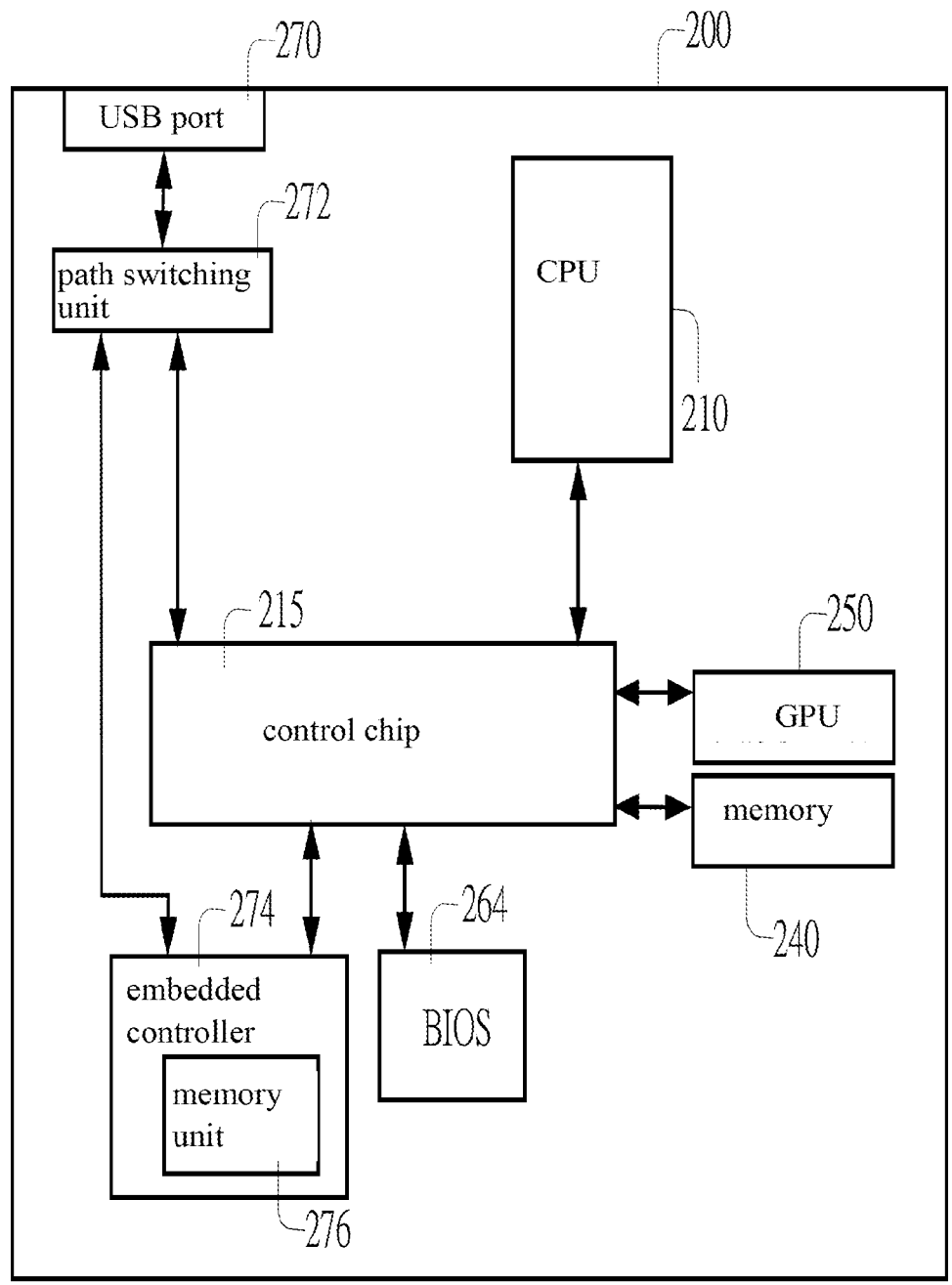
FIG. 2 is a schematic diagram showing the computer system in the second embodiment of the invention.

FIG. 2 is a schematic diagram showing the computer system in the second embodiment of the invention. The motherboard 200 of the computer system has a CPU 210, a control chip 215, a memory 240, a graphics processing unit (GPU) 250, an embedded controller 274, a path switching unit 272, a USB port 270 and a BIOS 264. The control chip 215 is connected to the CPU 210, the BIOS 264, the embedded controller 274 and the path switching unit 272. The path switching unit 272 is further connected to the embedded controller 274 and the USB port 270. In addition, the embedded controller 274 further includes a memory unit 276, and the embedded controller 274 may retrieve the device information and settings in the BIOS 264 and store them in the memory unit 276. The memory unit 276 herein is a non-volatile memory.

According to the second embodiment of the invention, the path switching unit 272 is a switch disposed on the motherboard 200. When the computer system is booted and the computer is in a normal operation status, the USB port 270 connects to the control chip 215 controlling by the path switching unit 272. The USB port 270 connects to a USB device (not shown). The computer system herein can be a USB host for accessing the USB device connected to the USB port 270. In addition, when the computer system is not booted, the user controls the path switching unit 272 to connect the USB port 270 to the embedded controller 274. The embedded controller 274 herein may be considered as a USB device, and the USB port 270 may be connected to another computer system (not shown) such as a notebook computer, which is considered as a USB host. Therefore, the other computer system may retrieve data in the memory unit 276 in the embedded controller 274.

Figure 3:
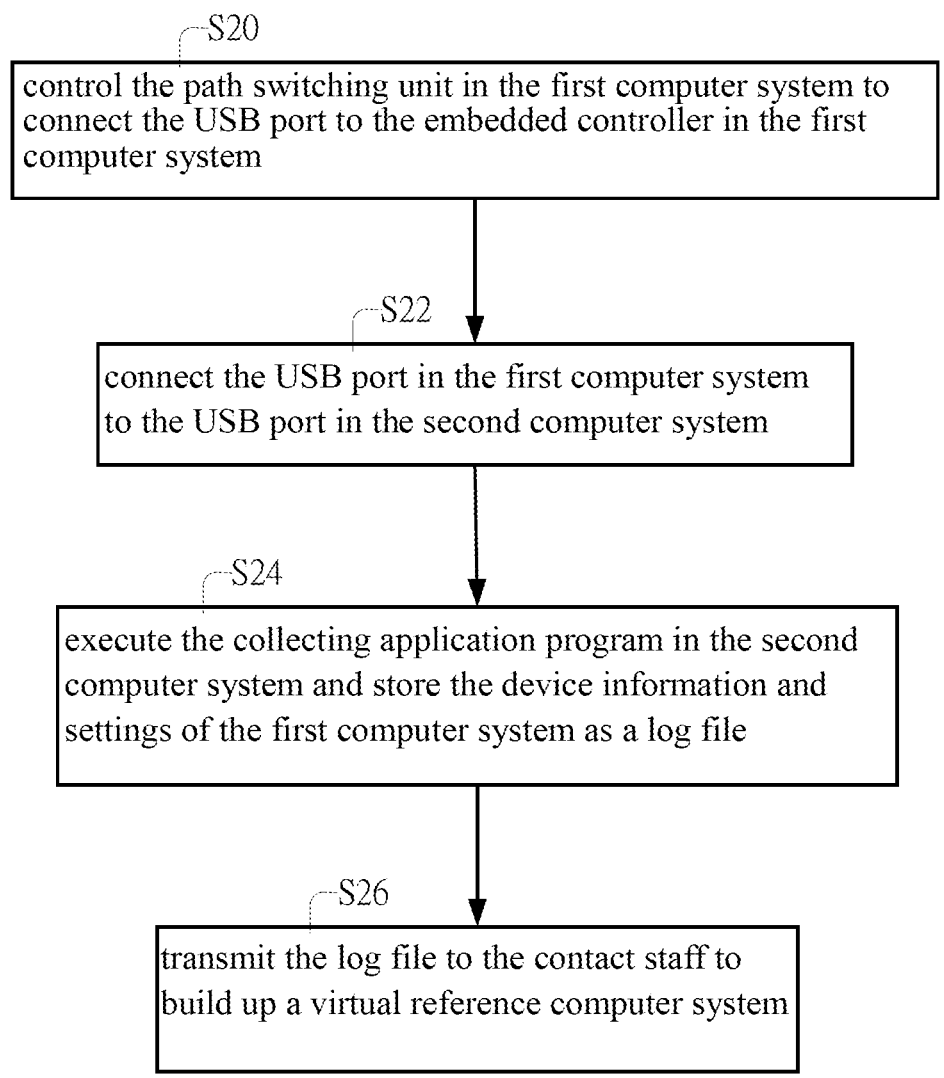
FIG. 3 is a flow chart showing the device information collecting method in the computer system in the second embodiment of the invention.

FIG. 3 is a flow chart showing the device information collecting method in the computer system in the second embodiment of the present invention. In the second embodiment, the user's computer system cannot be booted. In step S20, the user controls the path switching unit 272 in the first computer system to connect the USB port 270 to the embedded controller 274. In step S22, the USB port 270 of the first computer system is connected to the USB port of the second computer system. In step S24, the collecting application program is executed in the second computer system to store the device information and settings of the first computer system as a log file. In step S26, the log file is transmitted to the contact staff to build up a virtual reference computer system.

As shown in the above, the collecting application program is executed in the second computer system to retrieve the device information and settings stored in the memory unit 276 in the embedded controller 274. After executing the collecting application program, the second computer system stores the device information and settings of the first computer system as a log file.

Furthermore, the control chip may include a south bridge chip and a north bridge chip. In advanced computer systems, the control chip also may be integrated in the CPU. The ways in which the two types of computer systems are used as the first computer system to obtain log files are the same as that in second embodiment, and it is not illustrated thereto.

Therefore, the invention discloses a device information collecting method used in a computer system, which may use a collecting application program to store the device information and settings of the computer system as a log file. Therefore, the contact staff may build up a virtual reference computer system according to the log file.

In addition, in the invention, the way of connecting the first computer system and the second computer system is not limited to use USB ports, and a skilled person in the art may use other connecting ports such as an IEEE 1394 port, a network port and so on to achieve the present invention, which is also not limited.

Although the present invention has been described in considerable detail with reference to certain preferred embodiments thereof, the disclosure is not for limiting the scope of the invention. Persons having ordinary skill in the art may make various modifications and changes without departing from the scope. Therefore, the scope of the appended claims should not be limited to the description of the preferred embodiments described above.

What is claimed is:

1. A device information collecting method in a computer system, comprising the steps of:
    booting a computer system and entering an operating system;
    executing, with a processor, a collecting application program stored in a non-transitory storage medium in the operating system for detecting a plurality of device information and a plurality of basic input/output system (BIOS) settings in the computer system, wherein the device information comprises the information of a central processing unit (CPU) model, a interface card model, a memory capacity and a motherboard model;
    generating, with an embedded controller, a log file, wherein the log file comprises the device information and the BIOS settings;
    building up a virtual reference computer system according to the log file; and
    detecting a device problem in the computer system from the virtual reference computer system.

2. A device information collecting method in a computer system, comprising the steps of:
    switching a first connecting port in a first computer system to connect an embedded controller in the first computer system;
    connecting the first connecting port to a second connecting port in a second computer system;
    executing, with a processor, a collecting application program stored in a non-transitory storage medium in the second computer system for detecting a plurality of device information and a plurality of basic input/output system (BIOS) settings in the first computer system, wherein the device information comprises the information of a central processing unit (CPU) model, an interface card model, a memory capacity and a motherboard model;
    generating, with the embedded controller, a log file, wherein the log file comprises the device information and the BIOS settings;
    building up a virtual reference computer system according to the log file; and
    detecting a device problem in the computer system from the virtual reference computer system.

3. The device information collecting method in the computer system according to claim 2, wherein the embedded controller in the first computer system comprises a memory unit for storing the device information and settings of the first computer system.

4. The device information collecting method in the computer system according to claim 3, wherein the memory unit is a non-volatile memory.

5. The device information collecting method in the computer system according to claim 2, wherein a path switching unit is used to control the first connecting port in the first computer system to connect the embedded controller in the first computer system.

6. The device information collecting method in the computer system according to claim 2, wherein the first connecting port and the second connecting port comprise a universal serial bus (USB) port, an institute of electrical and electronics engineers (IEEE) 1394 port or a network port.

7. A computer system, comprising:
    a CPU:
    a BIOS;
    an embedded controller;

a connecting port;

a path switching unit connected to the connecting port and the embedded controller; and a control chip connected to the CPU, the BIOS, the embedded controller and the path switching unit;

wherein the path switching unit controls the connecting port to connect the embedded controller when the computer system is not booted, and another computer system retrieves data in a memory unit of the embedded controller.

8. The computer system according to claim 7, wherein the path switching unit signally connects the connecting port to the control chip when the computer system is booted and the computer is in a normal operation status.

9. The computer system according to claim 7, wherein a path switching unit is a switch.

10. The computer system according to claim 7, wherein the data in the memory unit of the embedded controller comprises the information of a CPU model, a hard disk model, an interface card model, a memory capacity, a memory model, a motherboard model or a plurality of BIOS settings.

11. The computer system according to claim 7, wherein the memory unit is a non-volatile memory.

12. The computer system according to claim 7, wherein the connecting port is a USB port, an IEEE 1394 port or a network port.

* * * * *